United States Patent [19]

Buehler et al.

[11] Patent Number: 5,753,920

[45] Date of Patent: May 19, 1998

[54] INTEGRATED CHARGE MONITOR

[75] Inventors: Martin G. Buehler, La Canada; Brent R. Blaes, San Dimas; George A. Soli, Lancaster, all of Calif.

[73] Assignee: California Institute of Technology, Pasadena, Calif.

[21] Appl. No.: 507,527

[22] Filed: Jul. 26, 1995

[51] Int. Cl.$^6$ ........................................................ G01T 1/02
[52] U.S. Cl. ............................. 250/370.06; 250/370.07; 250/394
[58] Field of Search .................... 250/370.06, 370.07, 250/394, 482.1

[56] References Cited

U.S. PATENT DOCUMENTS 5,332,903   7/1994   Buehler et al. ............... 250/370.07 X

FOREIGN PATENT DOCUMENTS 2584815    1/1987   France ........................... 250/394
63-224253  9/1988   Japan ............................ 250/370.06

OTHER PUBLICATIONS

Adams et al., "The Development of A MOS Dosimetry Unit for Use in Space," IEEE Transactions on Nuclear Science, vol. NS-25, No. 6, Dec. 1978, pp. 1607–1612.

Primary Examiner—Carolyn E. Fields
Assistant Examiner—Edward J. Glick
Attorney, Agent, or Firm—Fish & Richardson, P.C.

[57] ABSTRACT

An integrated charge monitor for measuring a level of cumulative radiation exposure includes semiconductor devices having characteristics that change with a cumulative level of radiation to which the devices are exposed, different amounts of radiation shielding associated with each of the devices, and circuitry operable to separately address each of the devices to measure a change in the characteristic of the selected device due to radiation exposure. The monitor may be implemented on a single integrated circuit chip. The monitor may also be employed in performing a spectrometric analysis of radiation based on the affect of the radiation on characteristics of multiple, differently-shielded semiconductor devices.

17 Claims, 16 Drawing Sheets

INTEGRATED CHARGE MONITOR

ORIGIN OF INVENTION

The invention described herein was made in the performance of work under a NASA contract, and is subject to the provisions of Public Law 96-517 (35 USC 202) in which the Contractor has elected to retain title.

BACKGROUND AND SUMMARY

The invention is directed to measuring a cumulative level of radiation exposure.

The reliability and life expectancy of satellites are affected by radiation-induced charging of the electronics of the satellites. For example, several recent failures of geosynchronous communications satellites are believed to be the result of an accumulation of charge in insulators of the satellites. The accumulation eventually produced arcs that caused failures in associated electronics.

It is known that radiation can induce charges in semiconductor devices such as, for example, in the gate oxides of field effect transistors. Since these charges tend to accumulate over time, the inventors noted that the cumulative radiation to which a semiconductor device (and the satellite or other object on which the semiconductor device is mounted) has been exposed, and the amount of charging resulting from such exposure, may be determined by measuring the effect of radiation induced charges on an operating characteristic of a semiconductor device.

The inventors developed an integrated charge monitor that measures a level of cumulative radiation exposure. The monitor includes a semiconductor device, preferably a p-FET having a characteristic (e.g., an output voltage) that, when appropriately biased, changes with a cumulative level of radiation to which the device is exposed. The monitor also includes circuitry operable to measure a change in the characteristic of the semiconductor device.

The integrated charge monitor may also include one or more of the following features. The integrated charge monitor preferably includes additional semiconductor devices, each of which has a characteristic that changes with a cumulative level of radiation to which the device is exposed. All of the semiconductor devices are positioned on a single integrated circuit chip.

The monitor may also include radiation shields operable to reduce the cumulative level of radiation to which the semiconductor devices are exposed. Shields corresponding to different devices are preferably of different strengths so that the levels of radiation to which the different devices are exposed are reduced by different amounts. Typically, the shields are formed from a single piece of material that is etched in regions overlying the semiconductor devices to produce regions that are thinner than the normal thickness of the material.

The use of multiple semiconductor devices and different levels of shielding permits the monitor to provide more precise measurements of radiation exposure than can be provided by a monitor using a single semiconductor device or multiple semiconductors having identical shielding. For example, assume that the characteristic of the semiconductor device can be sensed to within one of a hundred increments, and that it is desired to measure radiation exposure of up to 100 krads. A single semiconductor device can be shielded so that each of the 100 increments corresponds to 1 krad, which is quite imprecise at low levels of radiation. By contrast, if two semiconductor devices are available, the first device can be shielded so that each increment corresponds to 100 rad while the second device is shielded so that each increment corresponds to 1 krad. With this approach, the monitor can provide measurements that are precise to within 100 rads for exposure levels up to 10 krad, and can thereafter provide precision to within 1 krad at higher exposure levels (where precision to 100 rads is no longer necessary).

By using a large number of devices, detection speed can also be increased relative to a single radiation monitor. For example, a monitor using an array of one thousand devices would be able to detect given levels of radiation three orders of magnitude faster than would a monitor using a single device.

When the monitor includes multiple semiconductor devices, the monitor may also include circuitry (i.e., a multiplexer) for selecting between the semiconductor devices. The semiconductor devices and the selection circuitry are preferably positioned on a single integrated circuit chip. Use of a single chip ensures that, ignoring the effects of shielding, all of the semiconductor devices are exposed to the same level of radiation. In addition, the single chip ensures that all of the devices are affected to the same degree by process variations during the manufacturing process, and by temperature and power supply fluctuations.

Other devices may also be included in the single integrated circuit chip with the semiconductor devices and selection circuitry. For example, the chip may include a device for measuring the temperature of the chip (e.g., a temperature-dependent diode), to correct for temperature dependence of the semiconductor devices. Other devices for use in, for example, monitoring the power supply to the chip or verifying proper operation of the semiconductor devices or selection circuitry may also be included.

The monitor may also include a current supply that is operable to supply a current to the semiconductor device. The current supply typically produces a constant current that corresponds to a temperature-independent operating current at which the characteristic of the semiconductor device varies independently of temperature. The temperature-independent operating current eliminates temperature effects in calculation of the cumulative radiation level and dramatically simplifies the procedure by which the signal produced in response to the characteristic of the semiconductor device is converted to a measure of the cumulative level of radiation to which the device has been exposed.

The semiconductor device may produce an analog voltage corresponding to the characteristic of the semiconductor device, and the monitor may include an analog-to-digital converter operable to convert the analog voltage to a digital value for use by, for example, a processor. The monitor may also include an offset circuit to offset the analog voltage and thereby eliminate the effect of any pre-exposure voltage produced by the semiconductor device, and an amplifier circuit to conform the range of variation of the analog voltage to the acceptable input variation range for the analog-to-digital converter.

The integrated charge monitor may be incorporated in a system for measuring a level of cumulative radiation exposure. The system may include one or more integrated charge monitors and a processor operable to determine the level of cumulative radiation exposure based on signals produced by the integrated charge monitors. Each of the monitors may also include any or all of the features discussed above. Typically, the monitors are identical to each other.

In addition to any shields included within the individual monitors (which may vary from device to device within a particular monitor), the invention may also include shields of varying strength associated with each monitor to control the level of radiation to which each monitor is exposed.

In yet another aspect, an integrated charge monitor for measuring a level of cumulative radiation exposure may include multiple semiconductor devices having characteristics that change with a cumulative level of radiation to which the devices are exposed, circuitry for selecting one of the semiconductor devices, and circuitry operable to measure a change in a characteristic of the selected semiconductor device and to produce an output signal indicative of such a change.

In a final aspect, an integrated charge monitor that includes multiple semiconductor devices having characteristics that change with a cumulative level of radiation to which the devices are exposed may be used in spectrometry. Each device is shielded to a different degree so that each device is affected by radiation having a certain minimum energy, where the minimum energy increases with the thickness of the shield. Thus, by monitoring the effect of a radiation sample on each of the devices, the proportion of particles of different energies within the radiation sample can be determined.

DESCRIPTION OF THE PREFERRED EMBODIMENTS

Figure 1:
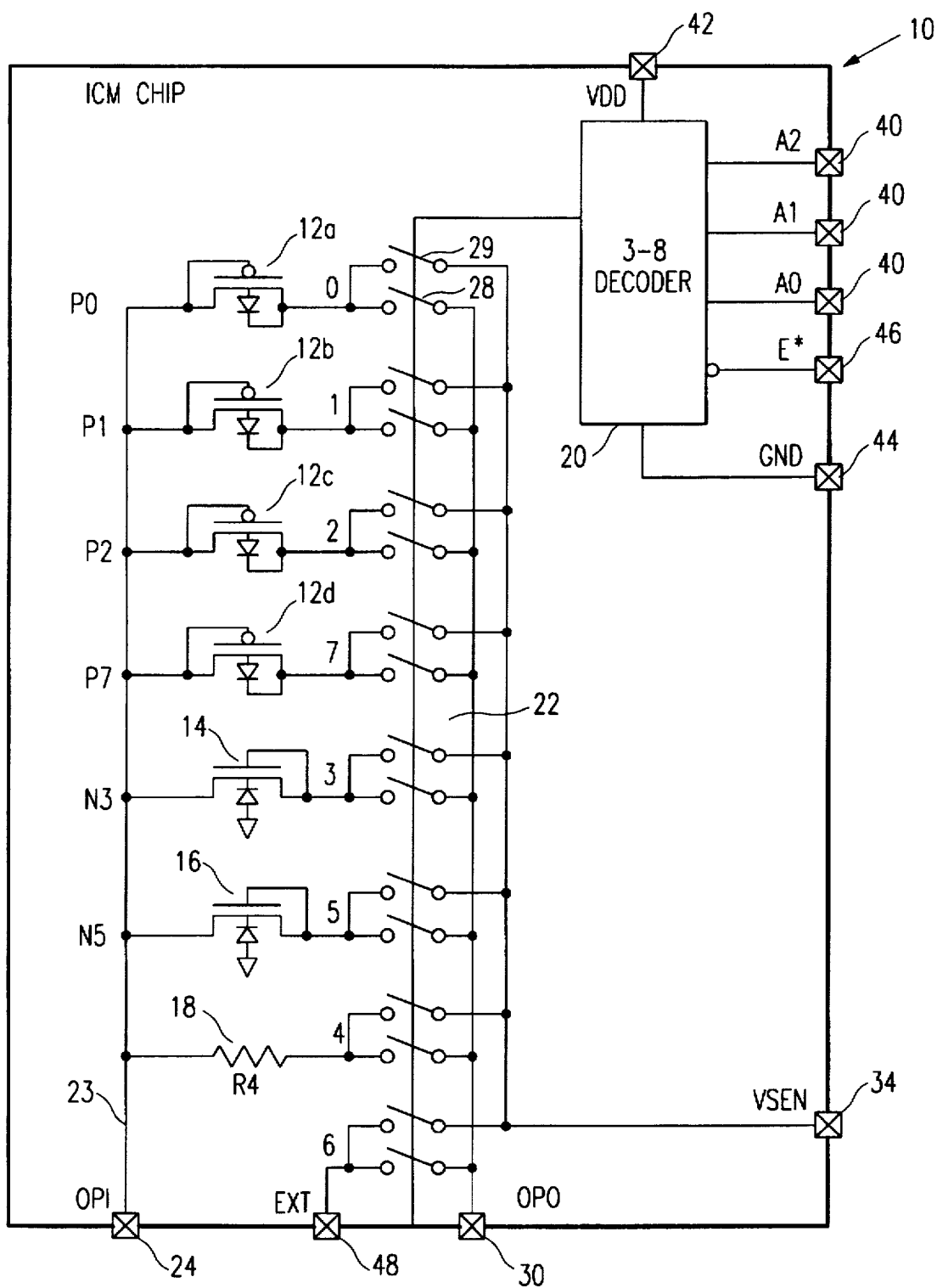
FIG. 1 is circuit diagram of an integrated charge monitor.

The circuitry of an integrated charge monitor ("ICM") 10 is illustrated in FIG. 1. The ICM was fabricated in a 1.2μm CMOS n-well process with a 20.8 nm thick gate-oxide, and includes seven discrete devices: four gate oxide p-FETs 12a–12d (individually identified as P0 (12a), P1 (12b), P2 (12c) and P7 (12d)), a field oxide n-FET 14 (N3), a gate oxide n-FET 16 (N5), and a resistor 18 (R4). The number associated with each discrete device is indicative of the address code used to access the device by on-chip multiplexer (MUX) circuitry that includes a 3-to-8 decoder 20 and a switching network 22.

Figure 5:
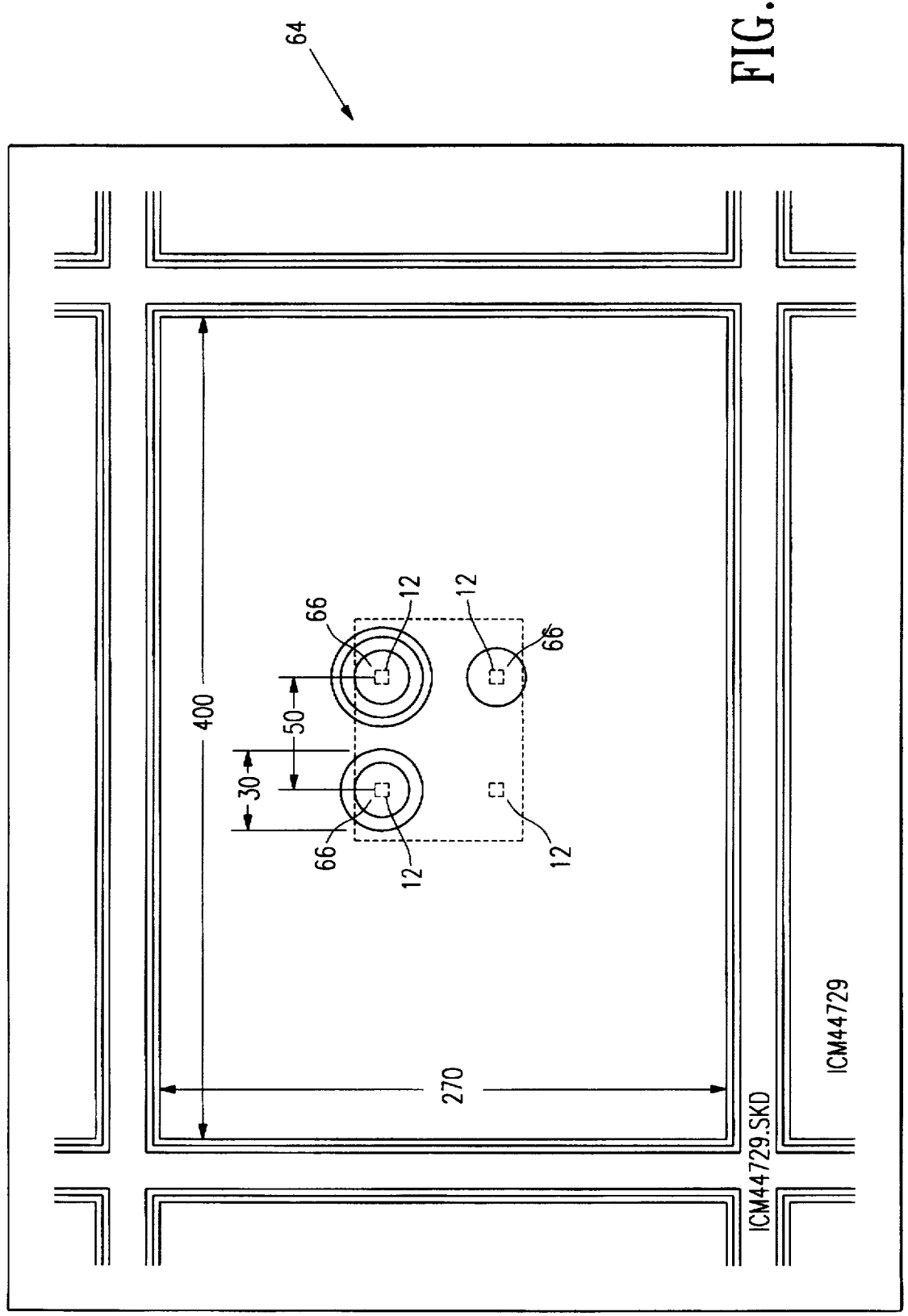
FIG. 5 is a schematic of a lid for the package of FIG. 4.

The p-FETs are covered by a lid 64 shown in FIG. 5. The lid has different amounts of shielding at locations corresponding to the different elements. Each of the p-FETs therefore samples a different portion of the radiation energy spectrum. (Lower energy radiation will affect lightly shielded devices while higher energy radiation is necessary to affect more heavily shielded devices.) P0 (12a), P2 (12c), and P7 (12d) include Kovar shields that are respectively 6, 2 and 10 mils thick. P1 (12b) is unshielded. The n-FETs and the MUX circuitry are shielded by a Kovar shield that is 10 mils thick.

The inventors recognized that radiation changes the operating characteristics of the FETs. For example, with high doses of radiation, the field oxide of an n-FET N3 should invert at 5 volts. This inversion point thereby signals the onset of excessive chip leakage, and can be used to evaluate the onset of radiation-induced failures in the on-chip MUX circuitry (20, 22). For the radiation levels used in the tests discussed below, the leakage of N3 remained less than 100 nA at 5 volts and temperatures less than 45° C. The gate oxide n-FET N5 is used in quality assurance.

Since the FETs are each affected by different levels of radiation energy, this system can also carry out spectrometry of the radiation. For example, the system could be used to generate a dose/depth profile for a proton beam.

The mux is used to switch between the various p-FETs to obtain their values. This decreases the necessary time for spectroscopy by a factor of 1/N, where N is the number of p-FETs.

The resistor R4, fabricated in metal-1, has a room temperature resistance of 3500 ohms. The resistor, which is a linear element, is used in quality assurance. In addition, the resistor has a temperature sensitivity of approximately 14 ohms/°C., and can therefore also be used as a thermometer. A diode may also be included for use in thermometry.

Figure 2:
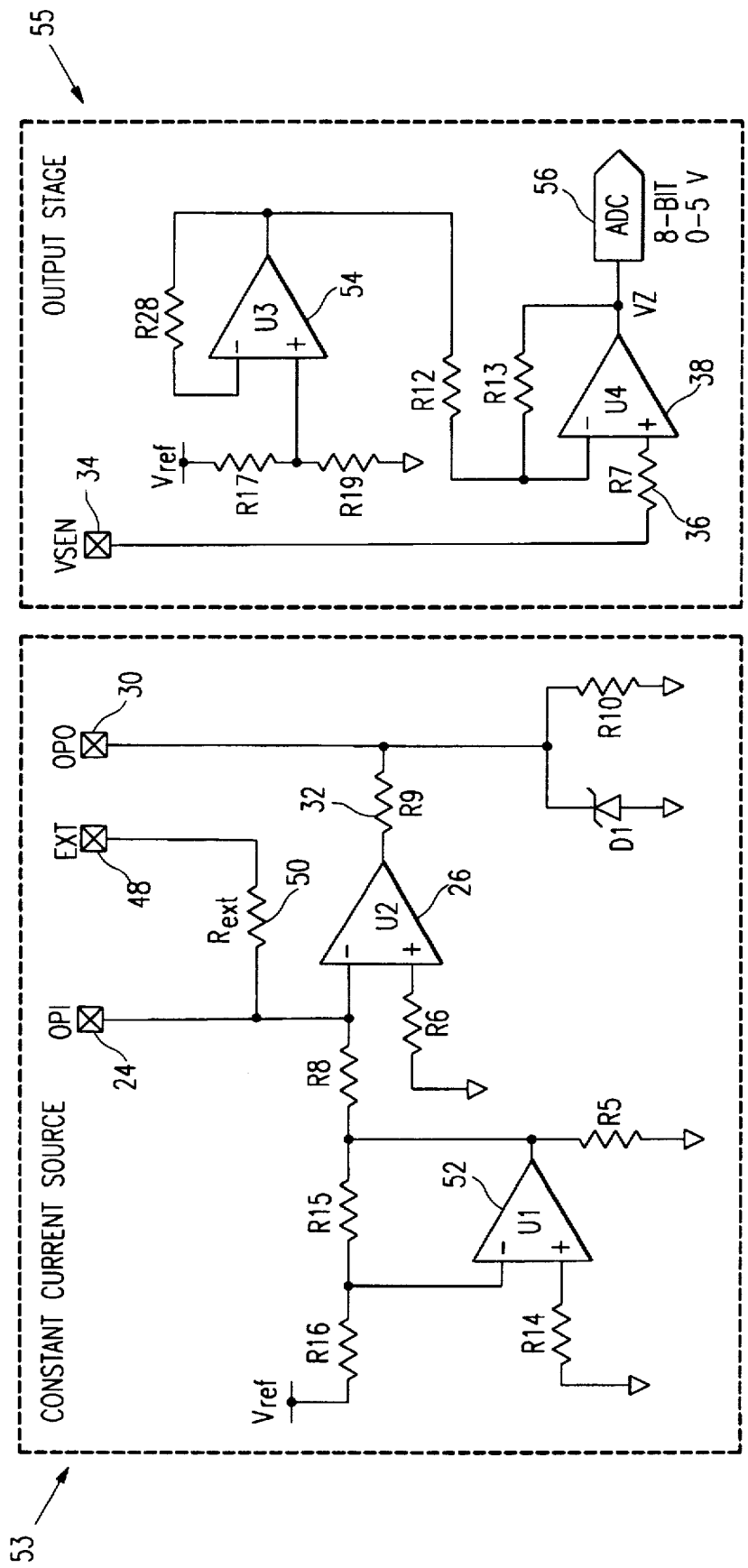
FIG. 2 is a circuit diagram of support circuitry for the integrated charge monitor of FIG. 1.

FIGS. 1 and 2 show that one end 23 of each of the n-FETs 14, 16, p-FETs 12a–12d and resistance 18 is connected to an output pin 24 (OPI). OPI 24 in turn is connected to the inverting input of an operational amplifier (OP-AMP) 26 (U2).

The other end 27 of each discrete device is connected through two switches 28, 29 of switching network 22. The output of switch 28 is connected to a pin 30 (OPO) that is connected through a resistor 32 (R9) to the output of OP-AMP U2 to provide current to discrete device. The output of switch 29 is connected to a pin 34 (VSEN) represents the sensed voltage. This is connected through a resistor 36 (R7) to the noninverting input of an OP-AMP 38 (U4). This switching arrangement is known as a Kelvin connection. In normal operation, the noninverting input of OP-AMP 38 (U4) does not draw any current. Accordingly, no current flows through the switches 29. For this reason, the Kelvin connection allows the device voltage to be measured accurately despite the resistive nature of the switches, Each switch 28 is fabricated as a transmission gate that includes an n-FET in parallel with a p-FET. The switches are controlled by signals produced by the decoder 20 in response to signals on address pins 40 (A0, A1, A2).

ICM 10 also includes a power pin 42 (VDD) and a ground pin 44 (GND) that power the decoder 20. An enable pin 46 (E*) enables operation of the decoder, and a pin 48 connects an external resistor 50 ($R_{ext}$) to the switching network 22. The external resistor provides measurement assurance when using the resistor R4 to measure temperature.

Each of the FETs is designed as a square enclosed device with a channel width W of 193.54μm and length L of 9.6μm.

The enclosed design means that peripheral gate leakage due to the bird's beak effect is completely eliminated. Each of the discrete devices is covered with metal-2 to reduce the effects of light and to add a small amount of radiation shielding.

Electrostatic discharge protection is provided by input protection circuitry (not shown) at inputs A0, A1, A2 and E*. In addition, the gates of the FETs are protected by their connections to the drain diodes of the FETs.

The support circuitry illustrated in FIG. 2 includes a constant current source 53 comprised primarily of OP-AMP 26 (U2) and an OP-AMP 52 (U1), and an output stage 55 comprised primarily of OP-AMP 38 (U4), an OP-AMP 54 (U3), and an analog-to-digital converter (ADC) 56.

The constant current source ensures that each p-FET operates at its temperature-independent point by supplying to the p-FET a current, $I_{Dmo}$, corresponding to that point. As discussed below, this current has been determined experimentally to be 100 μA for the p-FETs of the described embodiment.

The output stage converts the voltages produced by the p-FETs to voltages that vary across the input range of the ADC. For example, if the ADC responds to input voltages ($V_{ADC}$) that vary from zero to five volts, and a p-FET produces an output (VO) having a value of one volt when the p-FET has not been exposed to radiation and a value of two volts when the p-FET has been exposed to some maximum measured amount of radiation, the output stage would, ideally, produce an input to the ADC from the output of the p-FET according to:

$$V_{ADC}=5\cdot(VO-1).$$

In the constant current source, OP-AMP U1 is connected in an inverting configuration, with its non-inverting terminal connected to electrical ground through a resistor R14, and its inverting terminal connected to a reference voltage ($V_{Ref}$) through a resistor R16 and to its output through a resistor R15. The output of OP-AMP U1 is connected to ground through a resistor R5. In the described embodiment, the resistors have the following values (in ohms): R16, 10k; R15, 20k; R14, 6.65k; and R5, 1M. Accordingly, the output of OP-AMP U1 equals $-2V_{Ref}$.

OP-AMP U2 is also connected in an inverting configuration, with its non-inverting terminal connected to electrical ground through a resistor R6 and its inverting terminal connected to the output of OP-AMP U1 through a resistor R8 and to its output through the selected discrete device on ICM 10, which is in series with a resistor R9. In addition to being connected to ICM 10, resistor R9 is connected to ground through a resistor R10 that is connected in parallel with a Zener diode D1. OP-AMP U2 provides a constant current between pins OPO and OPI, with the magnitude of the current being controlled by the value of resistor R8:

$$I_{OPI}=2V_{Ref}/R8.$$

In the described embodiment, the resistors have the following values (in ohms): R8, 100k; R6, 19.6k; R9, 390; and R10, 1M. Because $V_{Ref}$ equals five volts, $I_{OPI}$ will equal 100 μA, which, as discussed above, is the temperature-independent current for the p-FETs of the described embodiment.

In the output stage, OP-AMP U3 provides an offset voltage used by OP-AMP U4 to correct for the initial value of the voltage (VO) produced by a p-FET when the p-FET has not been exposed to radiation. OP-AMP U3 is connected as a buffer, with its inverting terminal connected to its output through a resistor R28, and its non-inverting terminal connected to a voltage divider comprised of resistors R17 and R19. Because the output of OP-AMP U3 equals the voltage between resistors R17 and R19, the voltage supplied by OP-AMP U3 can be controlled by controlling the values of resistors R17 and R19. In the described embodiment, the resistors have the following values (in ohms): R17, 23.2k; R19, 10k; and R28, 6.9k. These values cause the output of OP-AMP U3 to equal $0.3V_{Ref}$.

OP-AMP U4 is connected as an amplifier, with its non-inverting input connected to VSEN through resistor R7, and its inverting input connected to its output through a resistor R13 and to the output of OP-AMP U3 through a resistor R12. The desired gain for OP-AMP U4 is determined from the dose sensitivity, $VO_{Dmo}$, for the p-FETs and the expected variation in the p-FET output voltage (VO) over the range of exposure levels to be measured. In the described embodiment, the p-FET output voltage varies by about one volt over the range of exposure levels, and OP-AMP U4 is therefore configured to have a gain that spreads the one volt variation in VO over the permissible variation in the input voltage to the ADC. In the described embodiment, the resistors have the following values (in ohms): R12, 2.49k; R13, 18k; and R7, 2.08k.

The output of OP-AMP U4 is connected to analog-to-digital converter 56, which converts an input voltage ranging from zero to five volts to an eight-bit digital value ranging between zero and 255. As discussed above, the offset voltage provided by OP-AMP U3 is used to ensure that the voltage supplied to the analog-to-digital converter is near zero volts when the discrete devices on ICM 10 have not been exposed to radiation. Similarly, because radiation effects can cause the output voltage of the p-FETs to vary by about one volt, the fivefold gain from OP-AMP U4 causes the voltage provided to the analog-to-digital converter to vary over the entire range to which the converter is sensitive.

Figure 3:
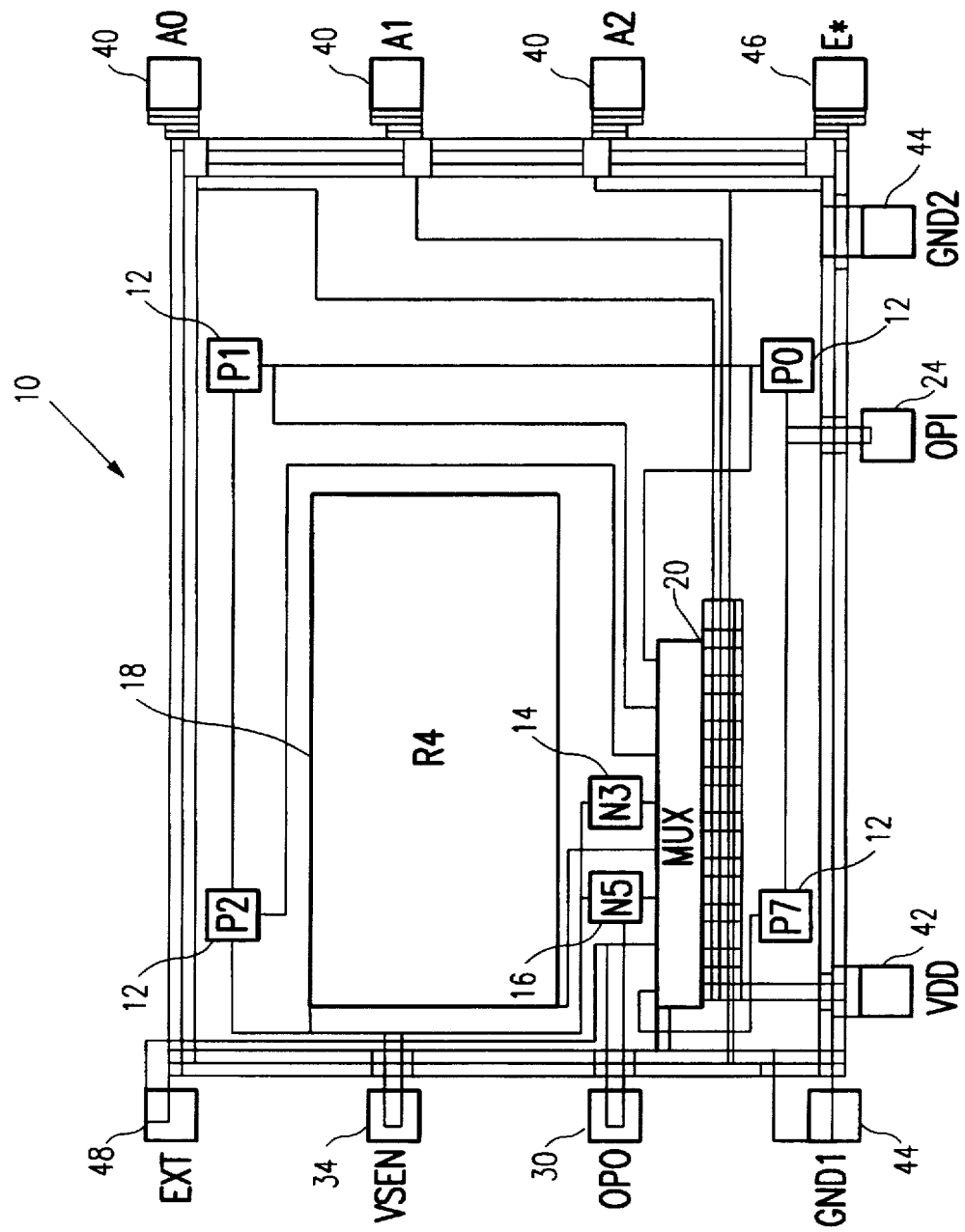
FIG. 3 is a circuit layout diagram of the integrated charge monitor of FIG. 1.
Figure 4:
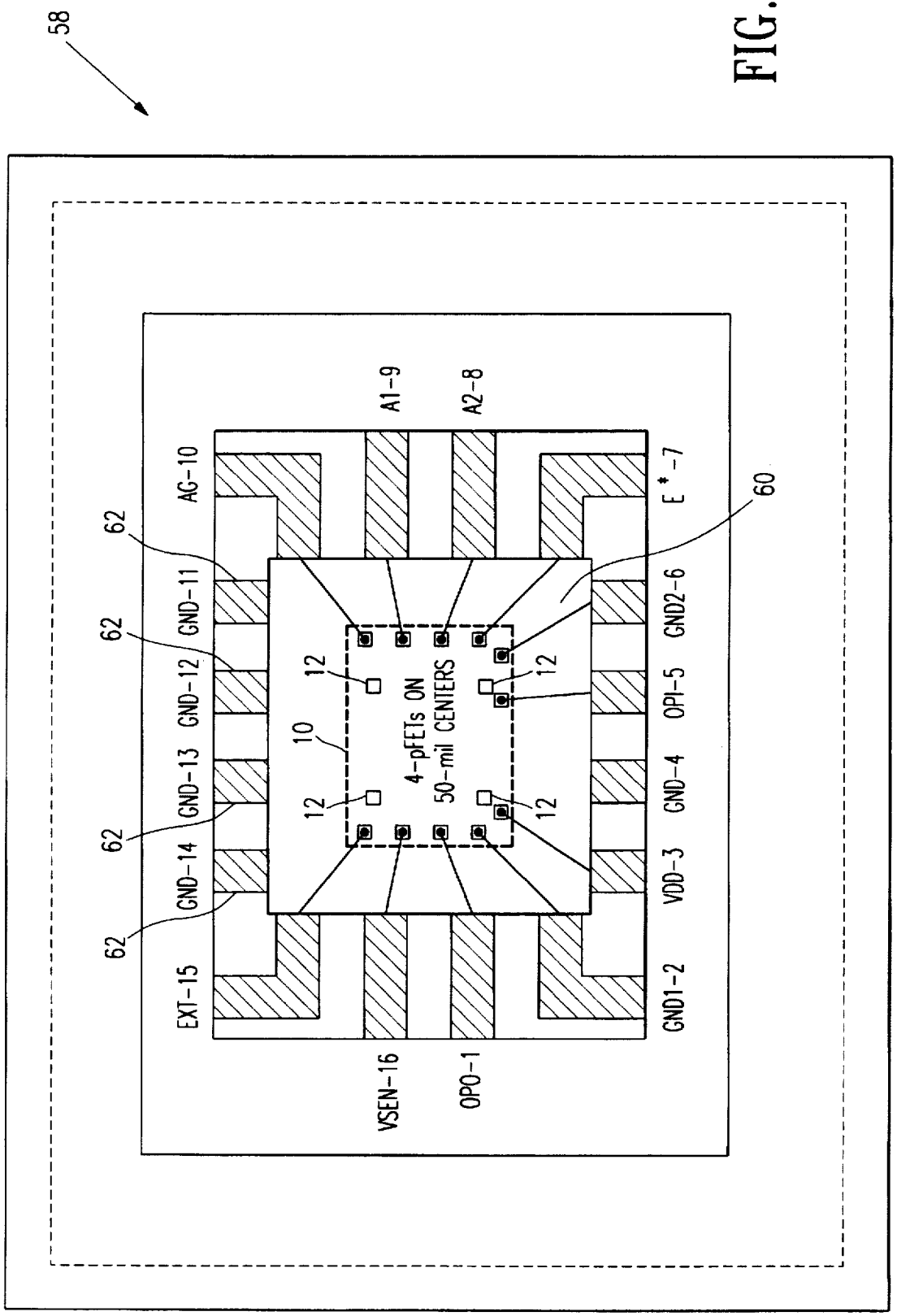
FIG. 4 is a schematic of a package for the integrated charge monitor of FIG. 1.

An ICM 10 may be implemented as shown in FIG. 3, with the p-FETS 12 arranged in a square and spaced from each other by 50 mils. Typically, ICM 10 is then placed in a 16-lead ceramic package 58, as illustrated in FIG. 4. The ceramic package has a cavity 60 that is 150 mil×165 mil. The unused leads 62 are grounded to the circuit board to eliminate spurious charging issues due to floating metal.

Package 58 is covered by the lid 64 illustrated in FIG. 5. The lid 64 is formed from a 10-mil thick sheet of Kovar using chemical etching and three masks to leave no shield over p-FET P1 (by removing the entire 10-mil thickness from the region of the lid over p-FET P1), a 2-mil shield over p-FET P2 (by removing a thickness of eight mils of the lid over p-FET P2), a 6-mil shield over p-FET P0 (by removing a thickness of four mils of the lid over p-FET P0) and a 10-mil shield over the rest of the devices (by removing none of the lid over these devices). The hole or thinned areas 66 over the p-FETs are approximately 30-mils in diameter and positioned over the four p-FETs which are arranged in a square 50-mils on a side. After chemically etching the lid, the lid is plated with a gold layer that leaves a matte finish on the surface. To emulate the normal practice used in packaging regular integrated circuits, the lid is not grounded.

The ICM chip 10 is secured to the package 58 using conducting polyamide. The chip is wire bonded to the package using 1.25-mil diameter aluminum wire doped with 1 percent silicon. Finally, the lid 64 is alloyed to the package 58 using a Au (80%) Sn (20%) metal preform at 290° C. for four minutes. This procedure is sufficiently accurate to allow the hole and the thinned areas in the lid to be positioned over devices P0, P1 and P2. Finally, the package 58 is soldered to a wiring board (not shown), without overcoating the package (which would alter the radiation shield calculations discussed below).

Figure 6:
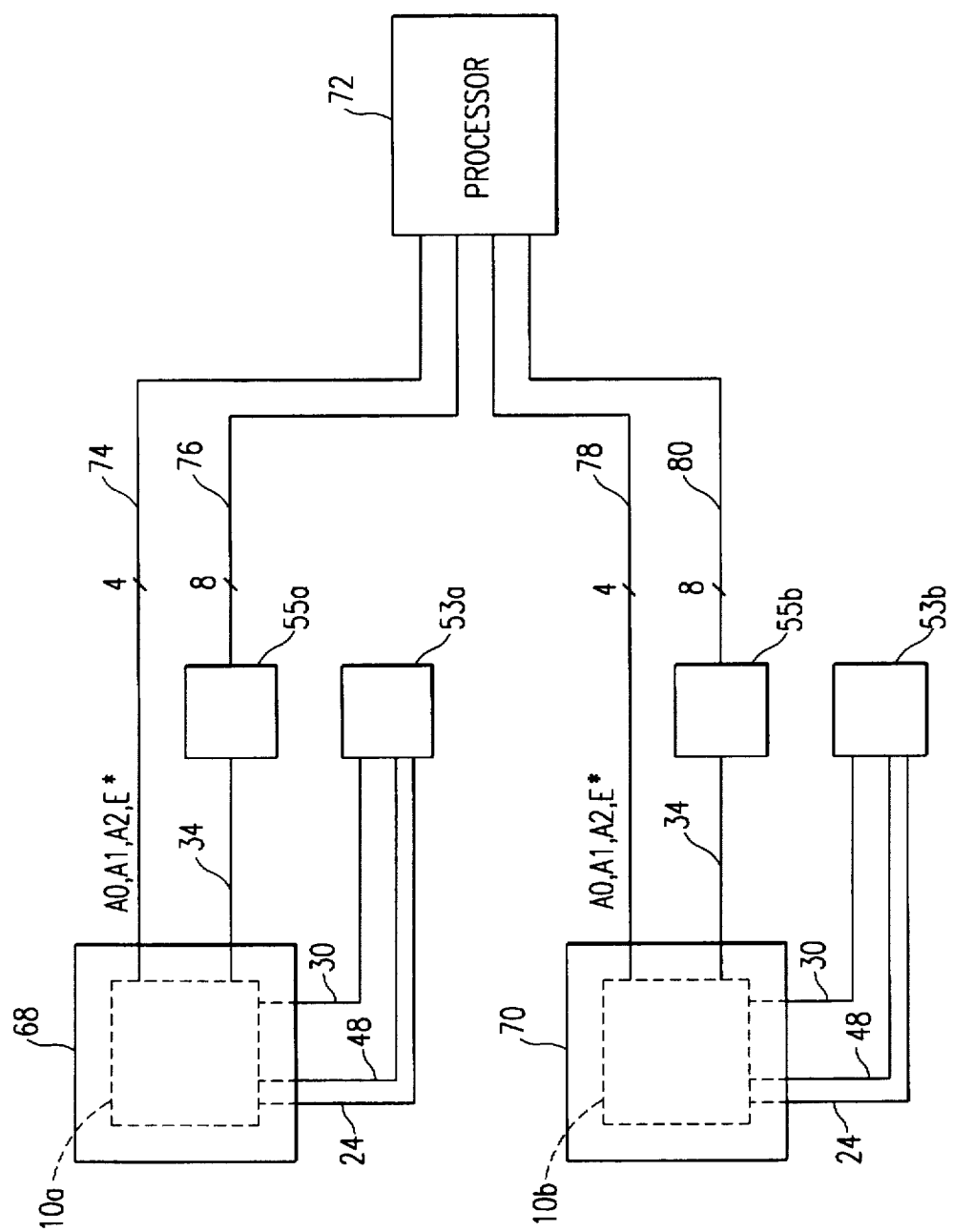
FIG. 6 is a block diagram of a system employing two integrated charge monitors.

In operation, as illustrated in FIG. 6, two ICMs are mounted on a communications satellite located in geosynchronous orbit, with one ICM (the outside ICM 10a) being located behind a shield 68 that is equivalent to 6-mils of Aluminum, and the other ICM (the inside ICM 10b) being located behind a shield that is equivalent to 30-mil. A processor 72 mounted in the satellite, enables the outside ICM 10a and selects one of the discrete devices thereof through four address and enable lines 74, and receives a signal from the ADC in the corresponding output stage 55a through eight data lines 76. Similarly, the processor enables the inside ICM 10b and selects one of the discrete devices thereof through four address and enable lines 78, and receives a signal from the ADC in the corresponding output stage 55b through eight data lines 80. Thus, the processor monitors each of the discrete devices of the two ICMs and, based on the results received, determines the level of radiation to which the satellite has been exposed.

Figure 7:
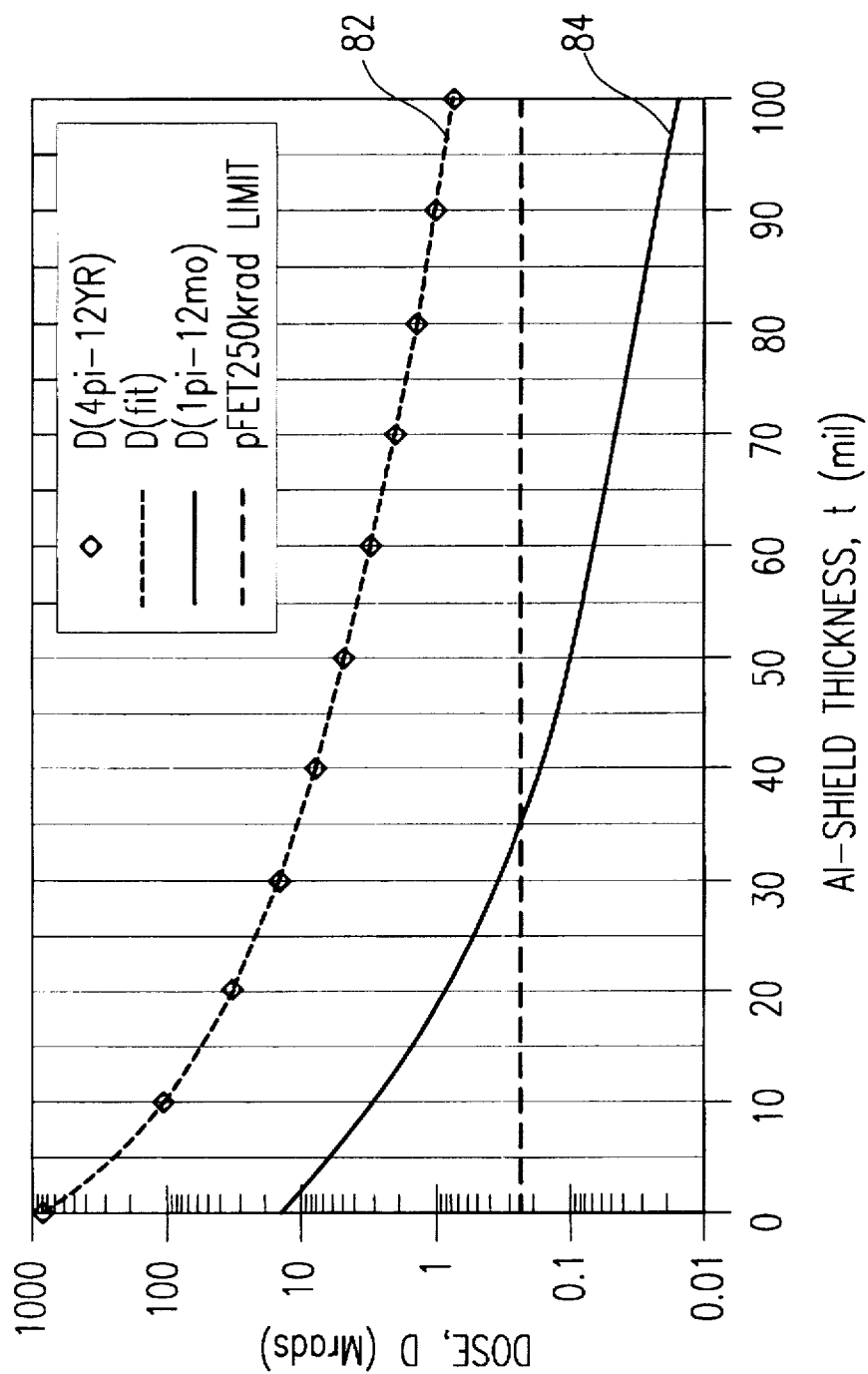
FIG. 7 is a graph of radiation dosages relative to aluminum shield thicknesses.

Shield thicknesses for the ICMs and their accompanying electronics were designed by determining the time required for each p-FET 12 to receive an arbitrary radiation dose of 250 krads. First, a mission dose-shield curve, which was derived from the AE8-MAX radiation model for a 12-year geosynchronous model and is shown in the upper curve 82 of FIG. 7, was derived using the following function:

$$D = D_r \cdot t \cdot S/(1 + d/d_o)^n \quad (1)$$

where D is the dosage at a particular time, $D_r$ =754.4 Mrads/(144 months·4πsr)=416.9 krads/month·sr, t is the number of months of exposure, n=3.038 and $d_o$ =11.81 mil. For convenience, this curve was scaled to the 12 month·π sr design curve 84 shown in FIG. 7 to permit calculation of design parameter for the p-FETs and their shields in reaching the arbitrary radiation limit of 250 krads.

Figure 8:
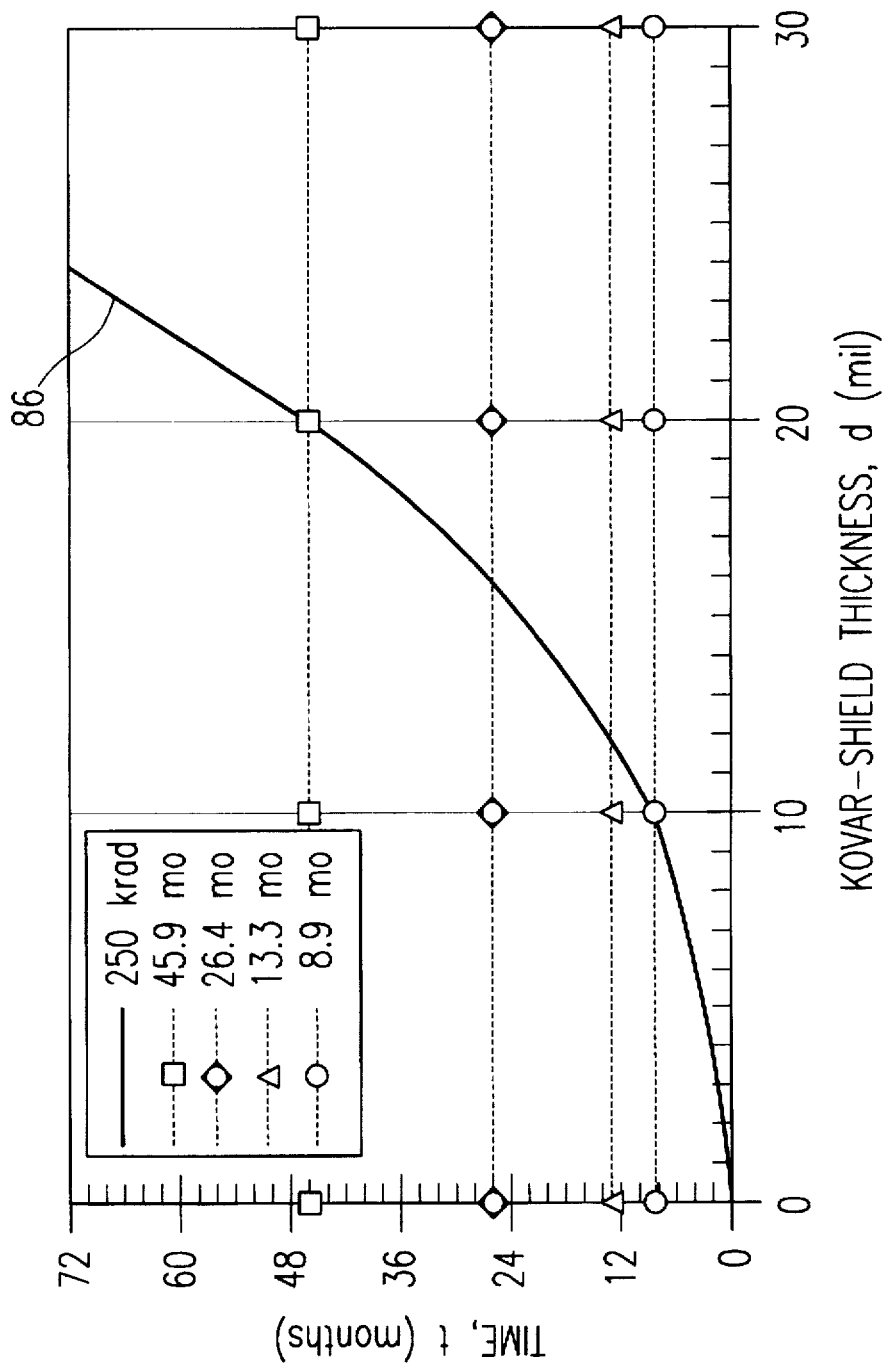
FIG. 8 is a graph of the time required for a 250 krad exposure relative to Kovar shield thicknesses.

The above equation was resolved and plotted as curve 86 in FIG. 8 to show the time to reach a dose of 250 krads given a certain Kovar shield thickness (where 3-mils of Al shield thickness corresponds to 1-mil of Kovar shield thickness). From curve 86, the expected times (in months) for each p-FET to receive 250 krads, given the combined effects of the shields 68, 70 (FIG. 6) and the lids 64 (FIG. 5) are as follows:

| Outside ICM | |
|---|---|
| P1 (2 mils) | 0.7 |
| P2 (4 mils) | 1.6 |
| P0 (8 mils) | 5.5 |
| P7 (12 mils) | 13.3 |
| Inside ICM | |
| P1 (10 mils) | 8.9 |
| P2 (12 mils) | 13.3 |
| P0 (16 mils) | 26.4 |
| P7 (20 mils) | 45.9 |

Thus, the 250 krad times range from close to 0.7 months (21 days) to 46 months (approximately four years).

Figure 9:
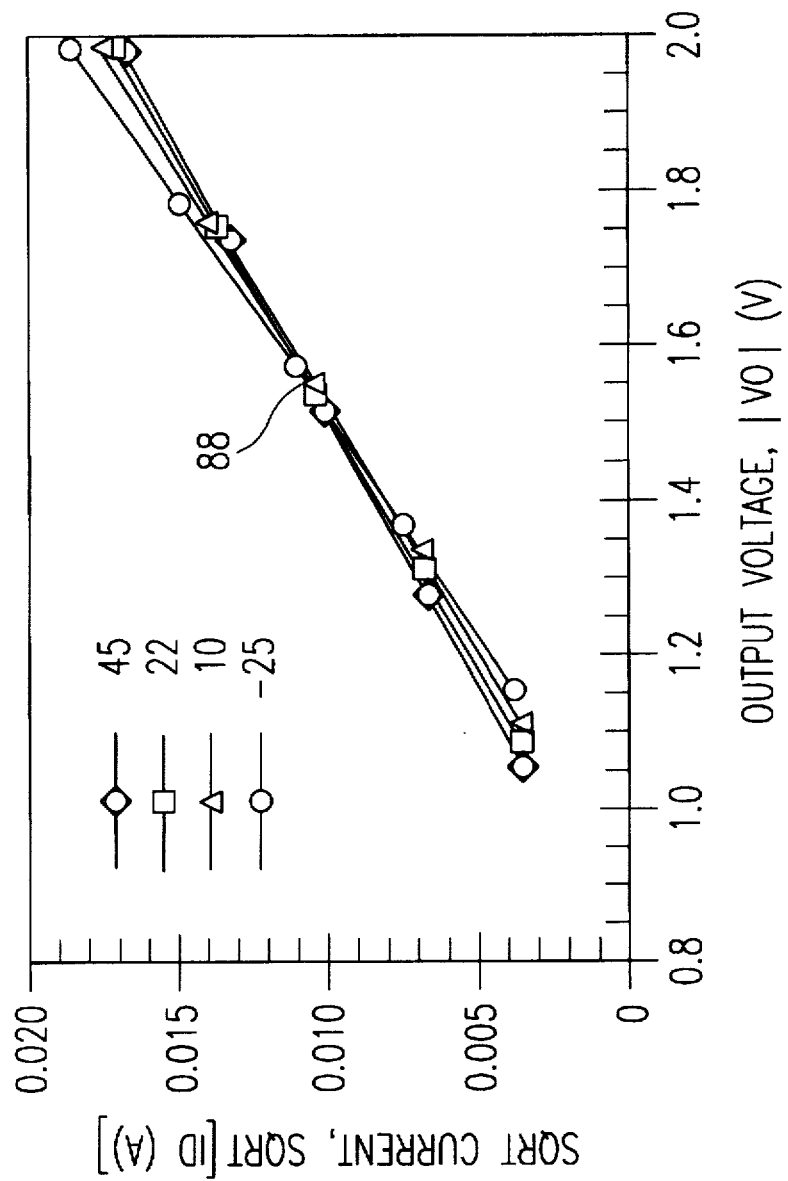
FIG. 9 is a graph of the drain current of a p-FET relative to output voltage for different temperatures.

The temperature-independent operating current for the p-FETs, which, as discussed above, is 100 µA and corresponds to the value of resistor R8, was determined by electrically testing the p-FETS of approximately twenty ICMs. Five current-voltage points were measured at each of four temperatures of −25, 10, 22 and 45° C., which were chosen after evaluating expected satellite operational temperatures. FIG. 9 shows that the temperature independent point 88 occurs when the drain current of the p-FET is near 100 µA and the output voltage (VO) is about 1.5 V. The value of R8 was therefore selected so that the p-FETS operate near this point and the temperature variations that occur at other operating points are eliminated.

To determine other operating characteristics of the p-FETs, the p-FETs were modeled as discussed below. Because the gates of the p-FETS are connected to the drains thereof, the p-FETs operate in the saturation region, and their drain currents ($I_D$) can be described by:

$$I_D = (\beta/2) \cdot (-VO + VT)^2 \quad (2)$$

where VO is the output of the p-FET, $\beta = KP \cdot W_e/L_e$, $KP = \mu_o \cdot C_o$, and VT is the p-FET threshold voltage (which is typically about 0.87 volts absent radiation effects). In an ICM, $L_e = L - \Delta L$ and $W_e = W - \Delta W$, where L and W are the as-drawn channel length and width, respectively. Because the p-FETs are square law devices, the equation can be expressed as:

$$\sqrt{I_d} = \sqrt{(\beta/2)} \cdot (-VO + VT). \quad (3)$$

This equation is used to fit the current-voltage data at each temperature and dose to determine VT and β. The equation for VO is found by rearranging the equation as:

$$VO = VT - \sqrt{(2 \cdot I_D/\beta)} . \quad (4)$$

This equation is used to determine the VO-dose calibration curve given VT, β and $I_D$, as discussed below.

The temperature-dose expression for VT is:

$$VT = VT_o + VT_T(T - T_o) + \Delta VT[1 - \exp(-D/D_o)] \quad (5)$$

where $T_o = 27°$ C., D is the dose, $VT_o$ is the threshold voltage at $T_o$ and D=0, $VT_T$ is the threshold voltage temperature coefficient, ΔVT is the maximum change in VT when the radiation reaches infinity and $D_o$ is the VT dose coefficient. When D=$D_o$, VT increases by 1/e.

The expression for $VT_T$ indicates that VT has a linear temperature dependence and a rate limiting dose dependence. The rate limiting term results because the oxide has a finite supply of hole traps that are gradually filled by radiation created holes. Note that the temperature and dose effects are independent in that there are no terms containing both $T_o$ and D.

The equation set forth above for VT was solved using the least squares method to determine $VT_o$, $VT_T$ and ΔVT. The parameter $D_o$ was found using an optimization technique that maximized the least squares correlation coefficient.

The dose-temperature expression for β is:

$$\beta = \beta_{\infty}(T/T_o)^{-n}[1 + (D/D_m)(T/T_o)^{-n}] \quad (6)$$

where $\beta_{\infty}$ is β evaluated at $T_o$ and D=0, n is the β temperature coefficient and $D_m$ is the mobility dose coefficient. When D=$D_m$ at T=$T_o$, β is reduced by 50 percent.

The parameters $\beta_{\infty}$ and $D_m$ were determined using the least squares method. For this operation, the following equation was used:

$$1/\beta = [1/\beta_{\infty}](T/T_o)^n + [1(\beta_{\infty} \cdot D_m)]D \quad (7).$$

This equation expresses the physical situation where the β temperature and dose dependencies are combined as the sum of reciprocals. The parameter $D_m$ was determined using an optimization technique that maximized the least squares correlation coefficient.

The operating point for the p-FET drain current at the temperature independent operating point is found by differentiating the VO expression with respect to temperature and setting the result to zero at the measurement temperature, $T_m$ and D=0. Thus:

$$I_{Dmo}=2\beta_{mo}{}^3(-VT_T/\beta_{Tmo})^2 \qquad (8)$$

where $\beta_{Tmo}=(-n/T_m)\beta_{mo}$ and $\beta_{mo}=(T_m/T_o)^{-n}$. That is, the operating current, $ID_{mo}$, can be set using the D=0 temperature characteristics.

Figure 10:
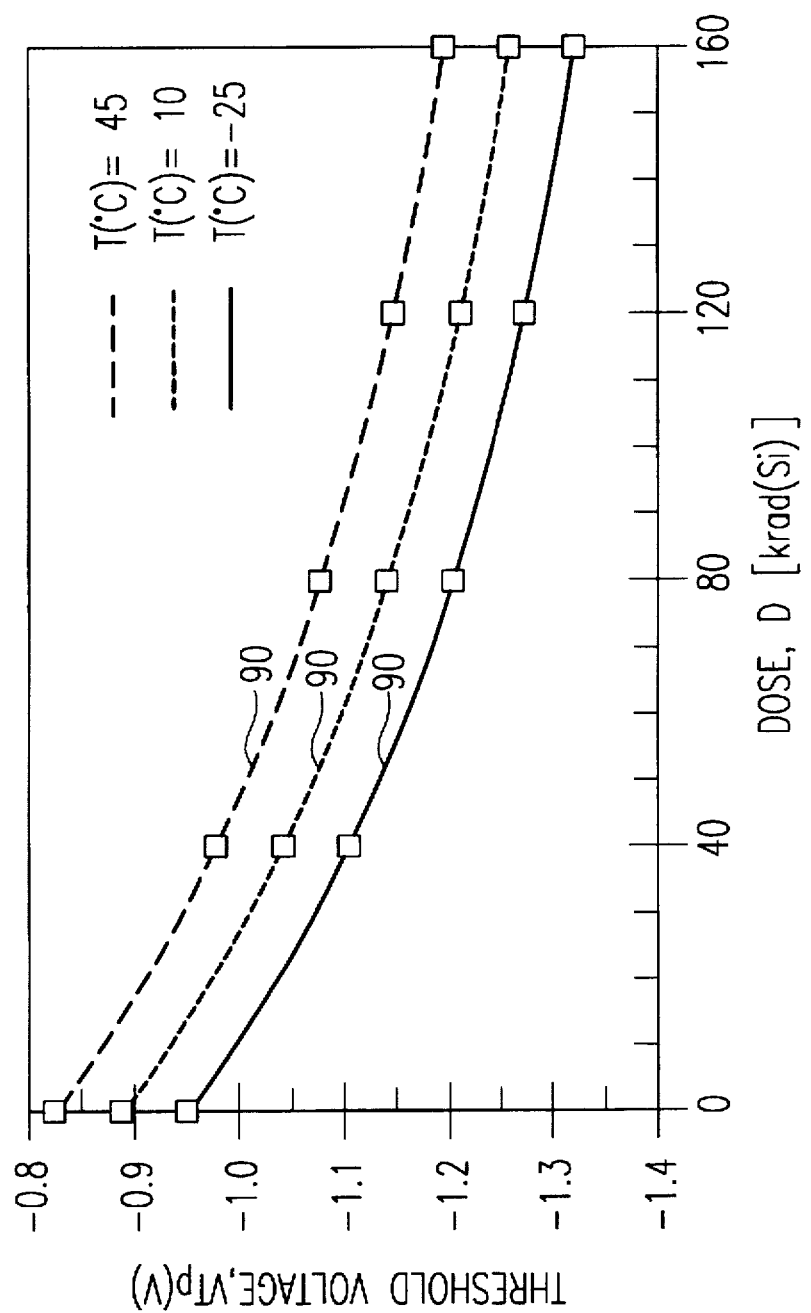
FIGS. 10–12 are graphs of expected threshold voltage, β, and output voltage of a p-FET relative to radiation dosage for different temperatures.
Figure 11:
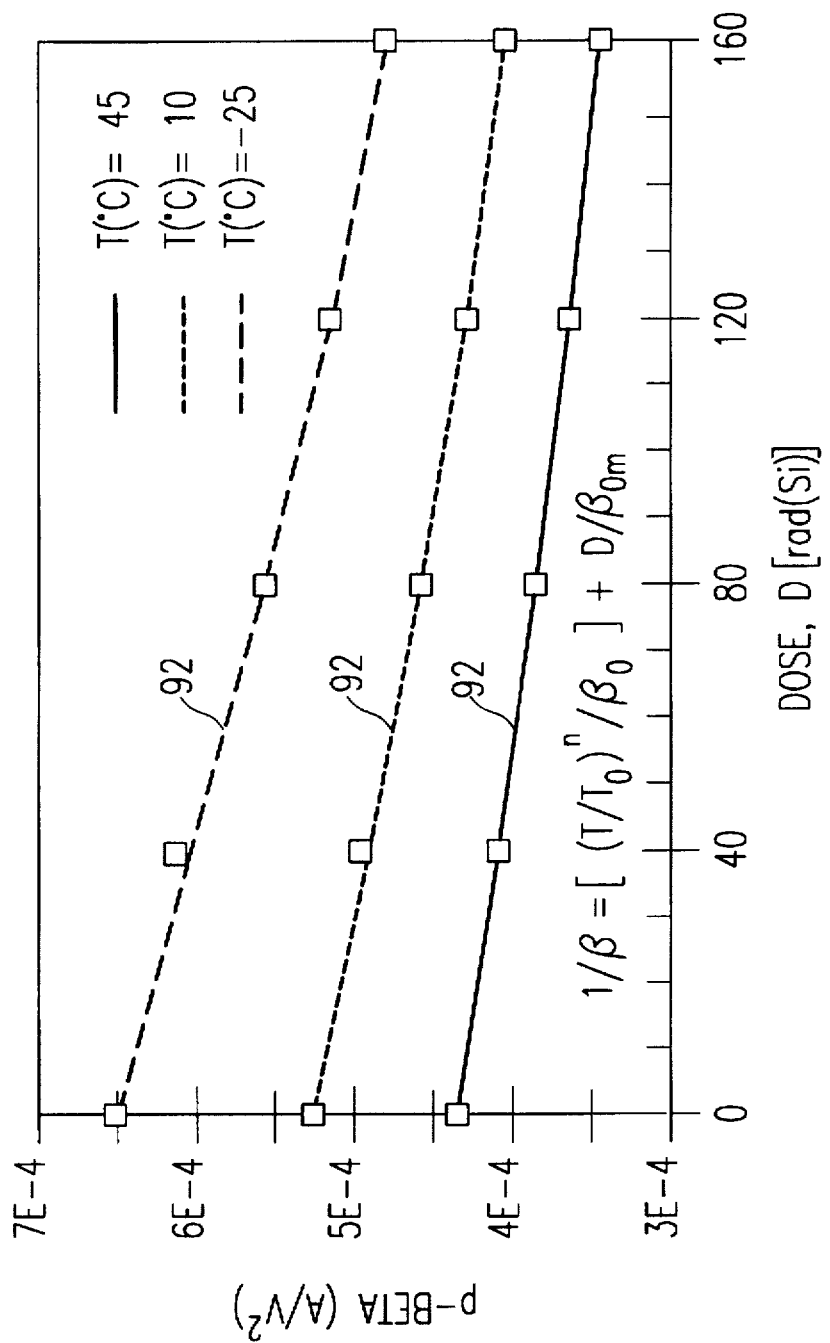
Figure 12:
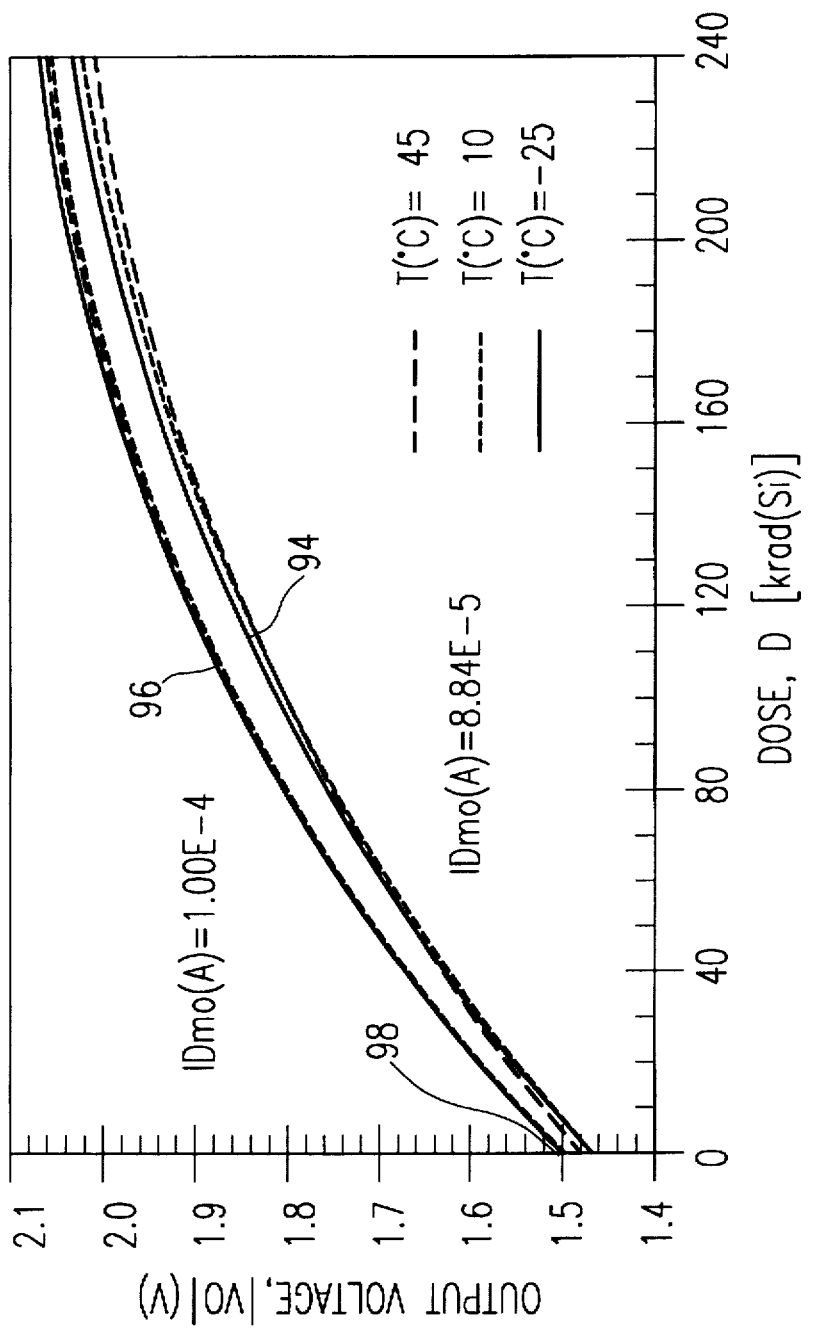

Values for VT, $\beta$ and VO are presented graphically in FIGS. 10 to 12. The curves 90 in FIG. 10 were derived using equation (5) for VT, and the curves 92 in FIG. 11 were derived using the equation (7) for $1/\beta$. Thus, operation of a p-FET can be characterized by seven parameters: $VT_{oo}$, $VT_T$, $\Delta VT$, $D_o$, $\beta_{oo}$, n and $D_m$. These parameters are listed below for the four p-FETs of a particular ICM 10:

| Parameter | Units | P0 | P1 | P2 | P7 |
|---|---|---|---|---|---|
| $VT_{oo}$ | V | −0.8598 | −0.8635 | −0.8608 | −0.8594 |
| $VT_T$ | mV/°C | 1.7595 | 1.7546 | 1.7552 | 1.7625 |
| $\Delta VT$ | V | −0.4998 | −0.4766 | −0.4982 | −0.5091 |
| $D_o$ | krad | 118.9166 | 111.5170 | 118.9511 | 122.6122 |
| $\beta_{oo}$ | $\mu A/V^2$ | 474.7261 | 472.5563 | 471.9271 | 475.4348 |
| n | none | 1.7169 | 1.7028 | 1.7096 | 1.7244 |
| $D_m$ | krad | 588.5114 | 604.2558 | 595.9169 | 573.4673 |

The VO values plotted in FIG. 12 were obtained from equation (4) using equation (5) for VT, equation (6) for $\beta$, and equation (8) for $ID_{mo}$. The VO values are plotted in FIG. 12 for two different values of $ID_{mo}$, where curves 94 correspond to a value of 100μA and curves 96 correspond to a value of 88.4μA. Curves 94 show that VO is fully temperature compensated at a dosage of zero (D=0). Curves 96 show that temperature compensation occurs near 100 krads, and the value 98 of curves 96 for a dosage of zero shows that $VO_{mo}$=1.507 V. These parameters were used as the target design parameters, with the 100 μA curves 96 designated as the calibration curves.

Curves 96 are based on a combination of equations 2, 4, 5 and 8. As this set of equations is too complicated to be used as a calibration curve, a simplified equation is used instead:

$$VO_m=VO_{mo}+\Delta VO_m(1-\exp(-D/D_x)) \qquad (9)$$

Figure 13:
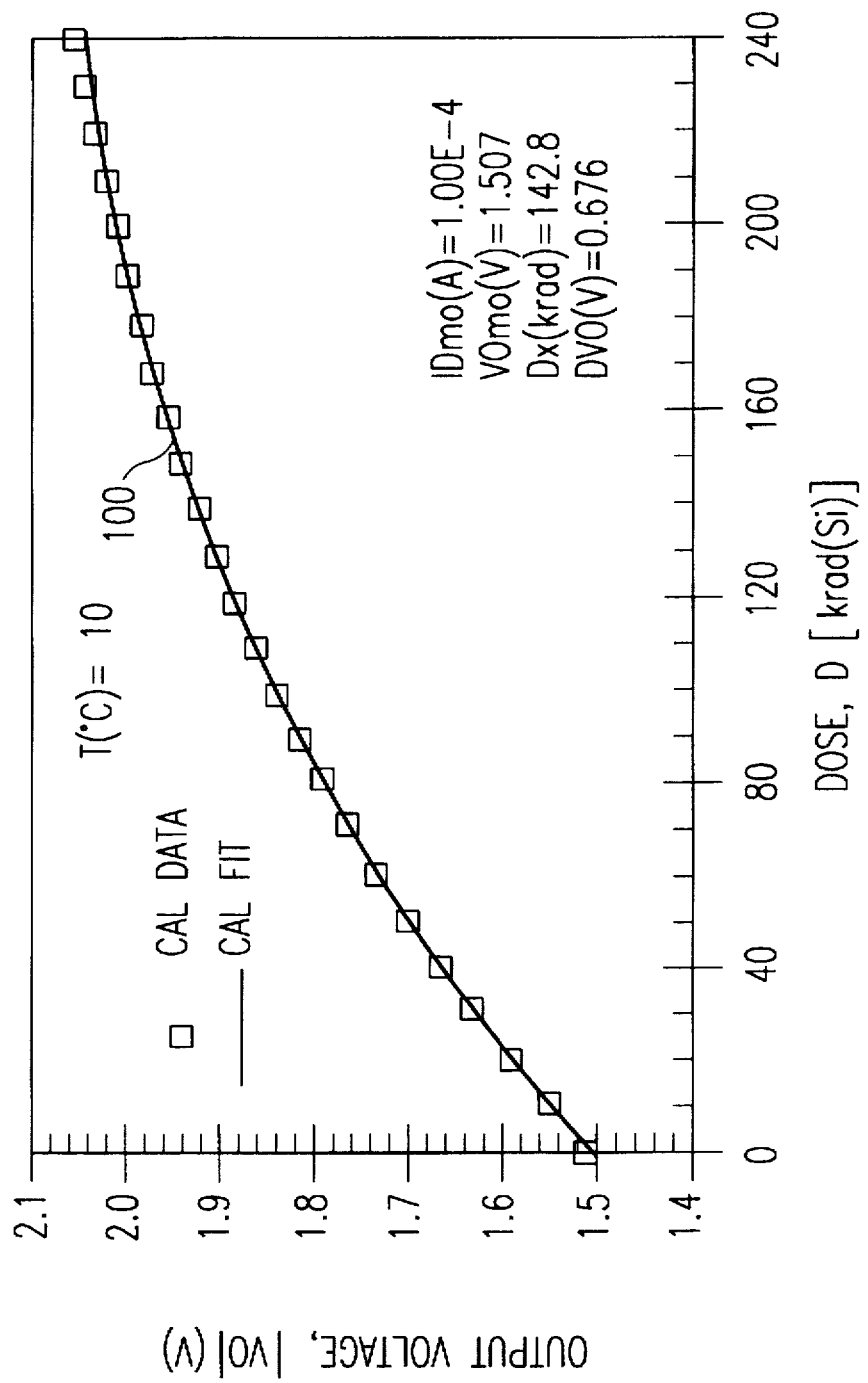
FIG. 13 is a graph of expected output voltage of a p-FET relative to radiation dosage.

This curve was derived at $T_m$=10° C., with the value for $VO_{mo}$ being taken from the experimental data. The parameters $\Delta VO_m$ and $D_x$ were fitted to the $T_m$=10° C. curve shown in FIG. 12 using the following equation:

$$ln(VO_{mo}+\Delta VO_{mi}-VO_m)=[ln(\Delta VO_{mj})]+[-1/D_x]D \qquad (10)$$

where the least squares method was used to determine the coefficients shown in the brackets in combination with an optimizer used to set $\Delta VO_{mi}-\Delta VO_{mj}=0$. The results are plotted in FIG. 13 as curve 100. The data were fitted over the dose range from 0 to 160 krads. Thus, the fit deviates from the data for doses greater than 160 krads.

The initial slope of the VO-dose curve is a critical design parameter. Differentiating equation 9 and evaluating at D=0 leads to:

$$Vo_{Dmo}=dVO_m/dD=\Delta VO_m/D_x, \text{ for } D=0 \qquad (11)$$

For a particular p-FET, $\Delta VO_m$=−0.7658 V and $D_x$=142.8 krad, so that $VO_{Dmo}$=−4.732 mV/krad.

The dose of radiation to which a p-FET has been exposed may then be calculated from the inverse of equation 9:

$$D=-D_x\cdot ln[1-(VO_m-VO_{mo})/\Delta VO_m] \qquad (12)$$

where $D_x$, $VO_{mo}$ and $\Delta VO_m$ are known constants, and $VO_m$ is produced by the ADC during operation of ICM 10 and varies with time. Equation 12 calls for $VO_m$ to be measured at the target measurement temperature, $T_m$, of 10° C. However, if the temperature compensation has been accomplished correctly, (i.e., $ID_{mo}$=100μA), then $VO_m$ will not vary with temperature and may be measured at other temperatures.

To verify proper operation of sample ICMs, radiation tests were performed in the JPL Shepard Co-60 radiation source calibrated with an air ionization chamber. The source produces an average 1.25 MeV gamma ray. The dose rate was 1 rad/sec and the dose proceeded in steps of 40 krads up to a total dose to 160 krads. The devices were protected from room backscatter radiation with a Pb-Al shield. Four devices were irradiated with their leads grounded. One device was irradiated while operating.

After the ICMs were exposed to 40 krads, electrical testing was performed at −25° C., 10° C. and 45° C. Frost build up on the ICMs was prevented by using liquid nitrogen to cool the ICMs and by progressing from cold to warm temperatures in the test sequence. To minimize radiation annealing, the ICMs were kept at 45° C. for less than 10 minutes. This procedure was repeated for cumulative exposures of 80, 120 and 160 krads. Thereafter, the ICMs were stored at room temperature for 94 hours and retested to account for the effects of annealing.

Figure 14:
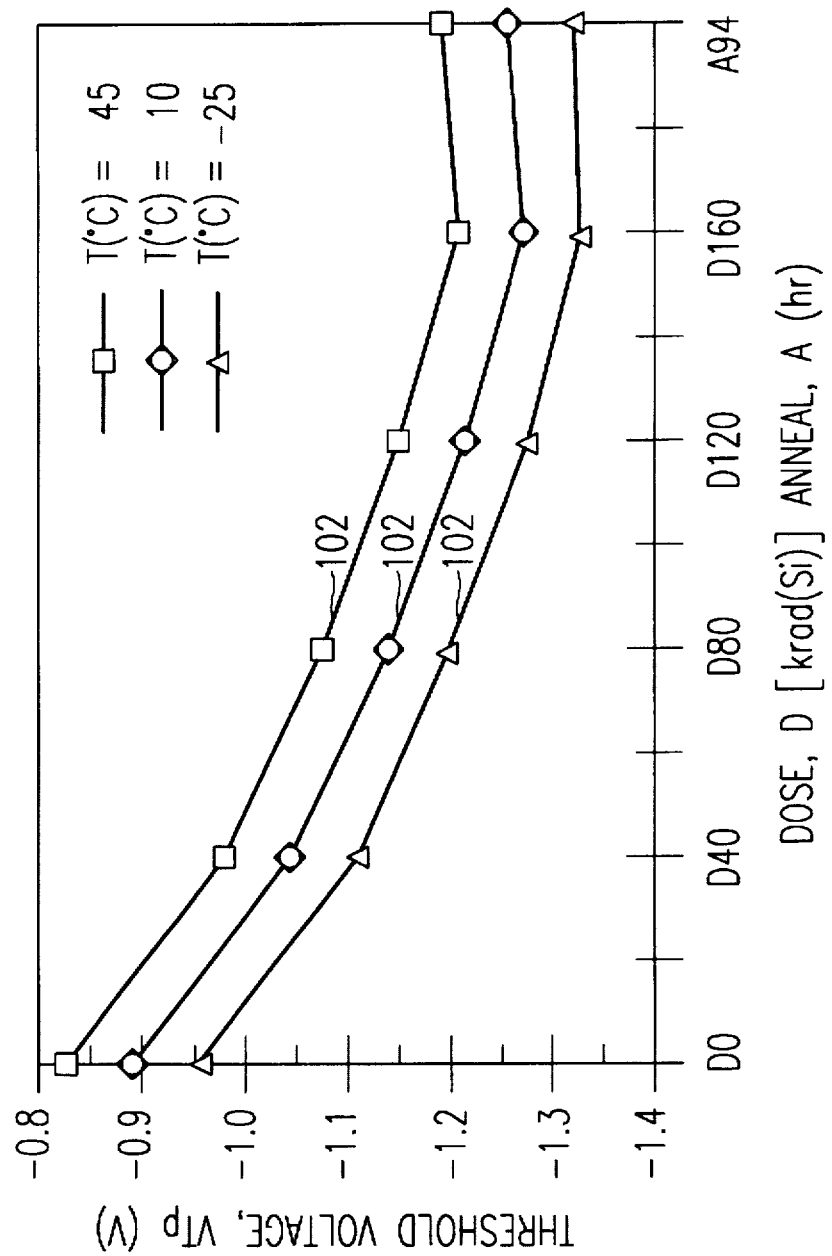
FIGS. 14 and 15 are graphs of measured threshold voltage and β for a particular p-FET relative to radiation dosage.
Figure 15:
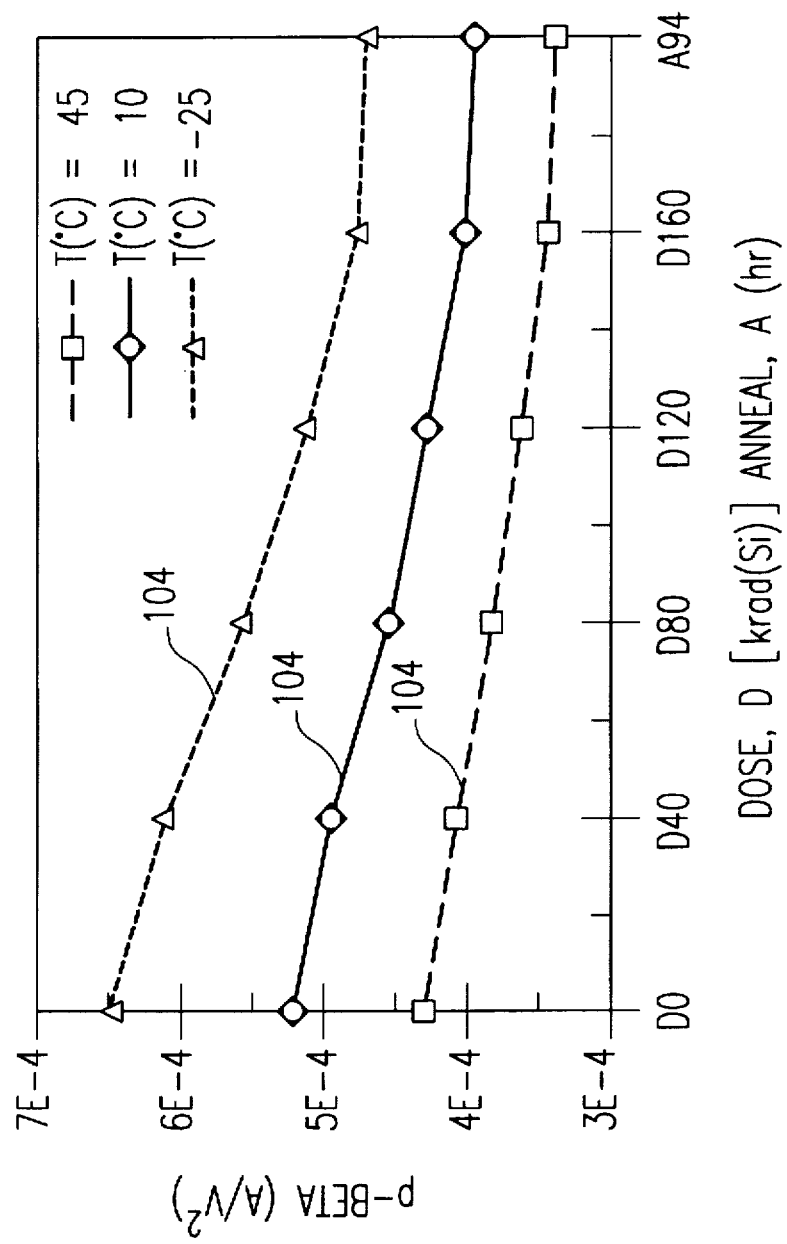
Figure 16:
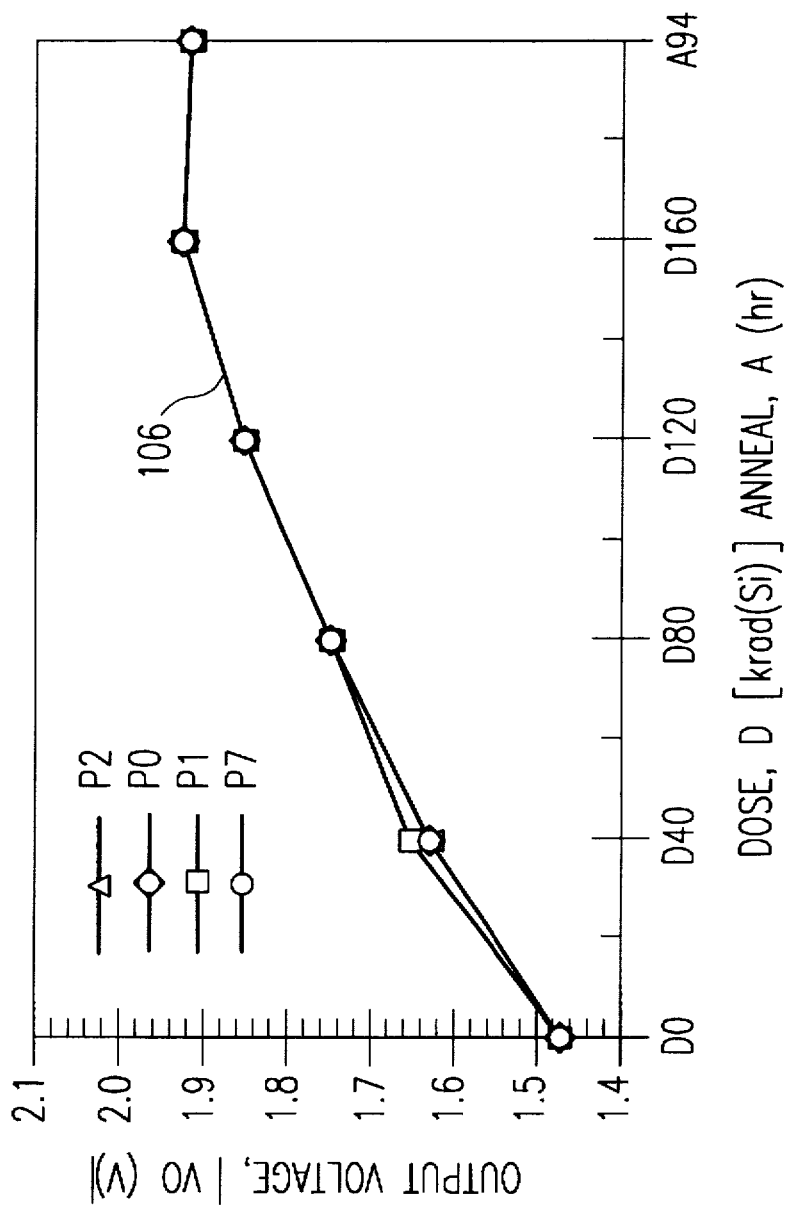
FIG. 16 is a graph of measured output voltage of the p-FETs of a particular integrated charge monitor relative to radiation dosage.

The results of radiation-anneal tests are shown in FIGS. 14–16, with FIGS. 14 and 15 showing the results for a particular p-FET and FIG. 16 showing the results for the p-FETs of a particular ICM. As shown, the p-FET VT, plotted in curves 102 of FIG. 14, shows a slight recovery after the storage period, while the p-FET $\beta$, plotted in curves 104 of FIG. 15, continues to decrease. However, the VO, plotted in curves 106 of FIG. 16, shows that the overall effect of annealing is minimal. Considering that the ICMs will typically be positioned in satellites that operate at temperatures that average about 10° C., annealing effects are insignificant and can be ignored.

As noted above, the data included in FIG. 16 includes results for all of the p-FETs in a particular ICM. As the results are quite close to each other, the calibration curve previously derived for one of the p-FETs (P0) can be used for all of the p-FETs in the ICM.

One important application of this system is in dosimeters. The p-FETs as used herein do not require any power source to detect radiation. During the radiation detection mode, they can be totally passive. When energized, they can report the total radiation dose.

Other embodiments are within the following claims.

What is claimed is:

1. An integrated charge monitor for measuring a level of cumulative radiation exposure, comprising:

a plurality of semiconductor devices, each device having a characteristic that changes with a cumulative level of radiation to which the device is exposed;

a plurality of radiation shields, each of which is associated with one of said semiconductor devices, wherein each of said shields protects its associated semiconductor device from a different amount of radiation, the plurality of radiation shields being formed from a single piece of material, a portion of the material corresponding to a first radiation shield being thinner than a portion of the material corresponding to a second radiation shield; and circuitry operable to separately address each of said semiconductor devices to measure a change in the characteristic of the addressed semiconductor device.

2. The integrated charge monitor of claim 1, wherein the plurality of semiconductor devices are p-FETs.

3. The integrated charge monitor of claim 1, wherein the plurality of semiconductor devices are positioned on a single integrated circuit chip.

4. The integrated charge monitor of claim 1, wherein the circuitry for separately addressing the semiconductor devices comprises a multiplexer.

5. The integrated charge monitor of claim 4, wherein the plurality of semiconductor devices and the multiplexer are positioned on a single integrated circuit chip.

6. The integrated charge monitor of claim 1, wherein the plurality of semiconductor devices comprises an array of semiconductor devices.

7. The integrated charge monitor of claim 1, wherein the thinner portion of the material corresponding to the first radiation shield is formed by etching the material.

8. The integrated charge monitor of claim 1, further comprising a current supply operable to supply a current to the semiconductor devices.

9. The integrated charge monitor of claim 8, wherein the current supply is operable to supply a constant current to the semiconductor devices.

10. The integrated charge monitor of claim 9, wherein the semiconductor devices have a temperature-independent operating current at which the characteristics of the semiconductor devices are independent of temperature, and wherein the constant current produced by the current supply corresponds to the temperature-independent operating current of the semiconductor devices.

11. The integrated charge monitor of claim 1, wherein the semiconductor devices produce analog voltages corresponding to the characteristics of the semiconductor devices.

12. The integrated charge monitor of claim 11, further comprising an output circuit including an analog-to-digital converter operable to convert the analog voltages produced by the semiconductor devices to digital values.

13. An integrated charge monitor for measuring a level of cumulative radiation exposure, comprising:

a plurality of semiconductor devices, each of which has a characteristic that changes with a cumulative level of radiation to which the device is exposed, the semiconductor devices producing analog voltages corresponding to the characteristics of the semiconductor devices;

a plurality of radiation shields, each of which is associated with one of said semiconductor devices, wherein each of said shields protects its associated semiconductor device from a different amount of radiation;

circuitry operable to separately address each of said semiconductor devices to measure a change in the characteristic of the addressed semiconductor device; and an output circuit including an analog-to-digital converter operable to convert the analog voltages produced by the semiconductor devices to digital values, wherein the output circuit includes an offset circuit operable to offset the analog voltages to produce offset analog voltages, and wherein the analog-to-digital converter is operable to convert the offset analog voltages to the digital values.

14. The integrated charge monitor of claim 13, wherein the output circuit includes an amplifier circuit operable to amplify the offset analog voltages to produce amplified offset analog voltages, and wherein the analog-to-digital converter is operable to convert the amplified offset analog voltages to digital values.

15. An integrated charge monitoring system for measuring a level of cumulative radiation exposure, comprising:

an integrated charge monitor operable to produce a signal corresponding to the level of cumulative radiation exposure, and a processor operable to determine the level of cumulative radiation exposure based on the signal produced by the integrated charge monitor;

wherein the integrated charge monitor includes a plurality of semiconductor devices, each of which has a characteristic that changes with a cumulative level of radiation to which the device is exposed, a first of said semiconductor devices having no shielding, a single piece of material forming a plurality of radiation shields, said piece of material being associated with the semiconductor devices other than said first semiconductor device and each of said shields protecting its associated semiconductor device from a different amount of radiation than another one of the shields protects the semiconductor device associated with that shield, and circuitry operable to separately address each of the semiconductor devices to measure a change in the characteristic of the addressed semiconductor device and to produce a signal corresponding to the level of cumulative radiation exposure for that device.

16. The integrated charge monitoring system of claim 15, further comprising a second integrated charge monitor.

17. The integrated charge monitoring system of claim 16, wherein the second integrated charge monitor is identical to the first integrated charged monitor.

* * * * *